Patented June 30, 1953

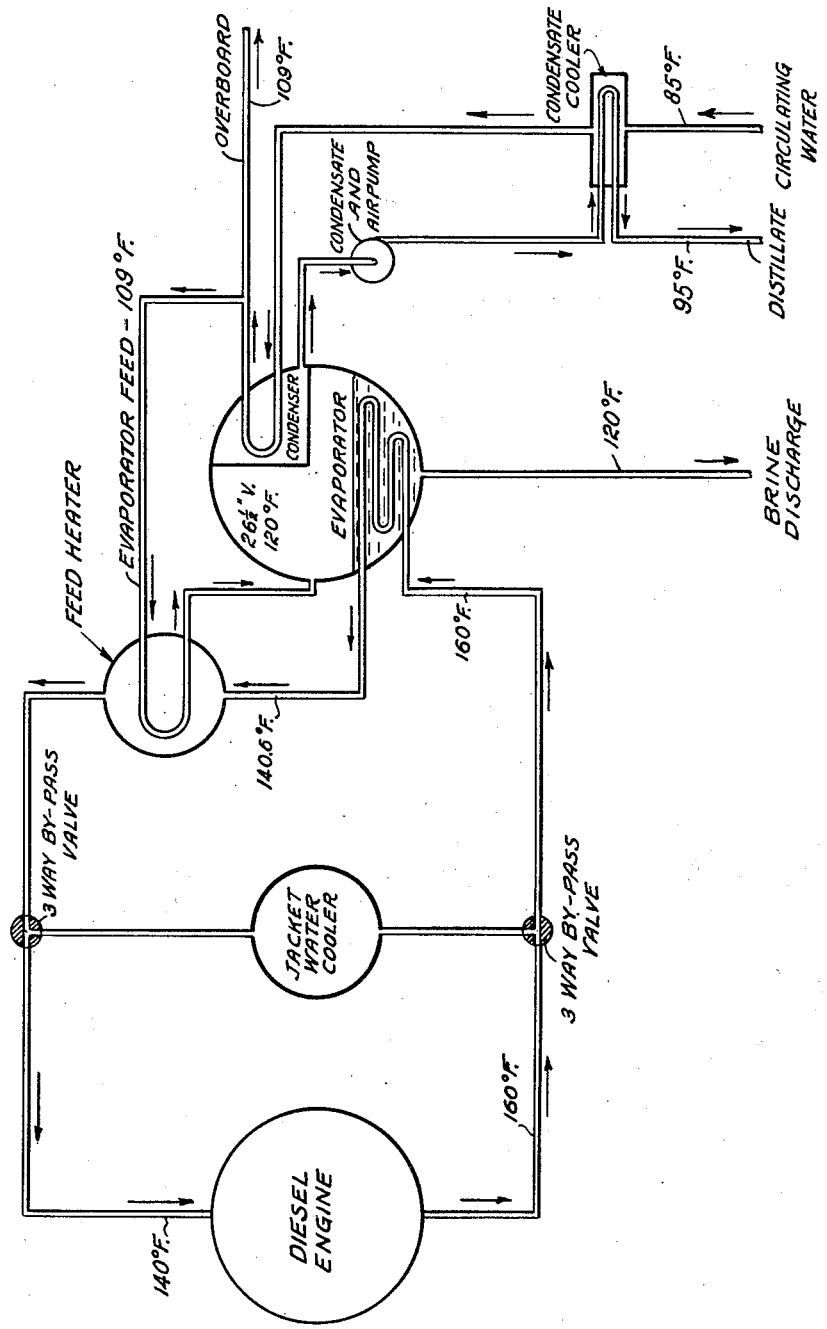

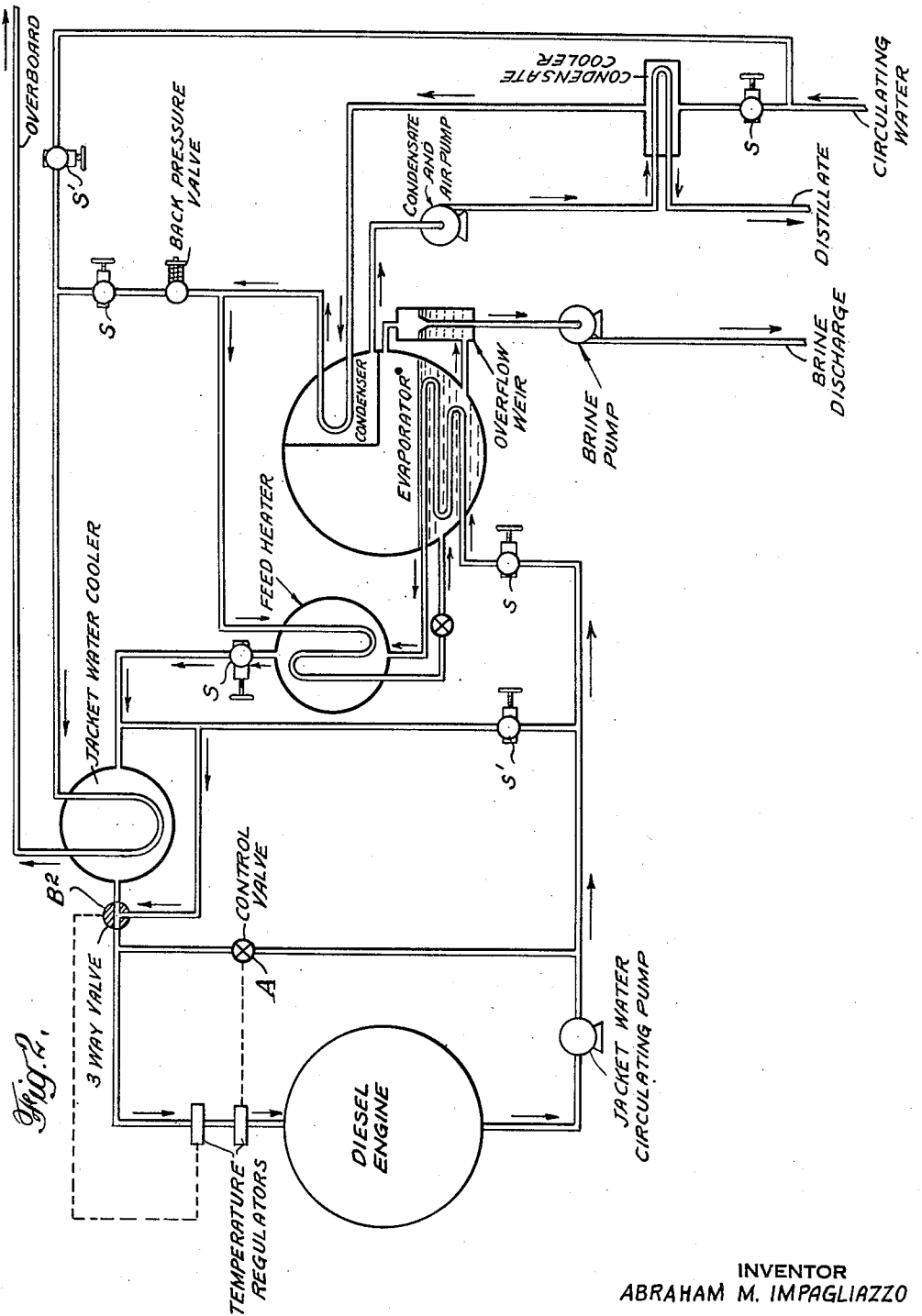

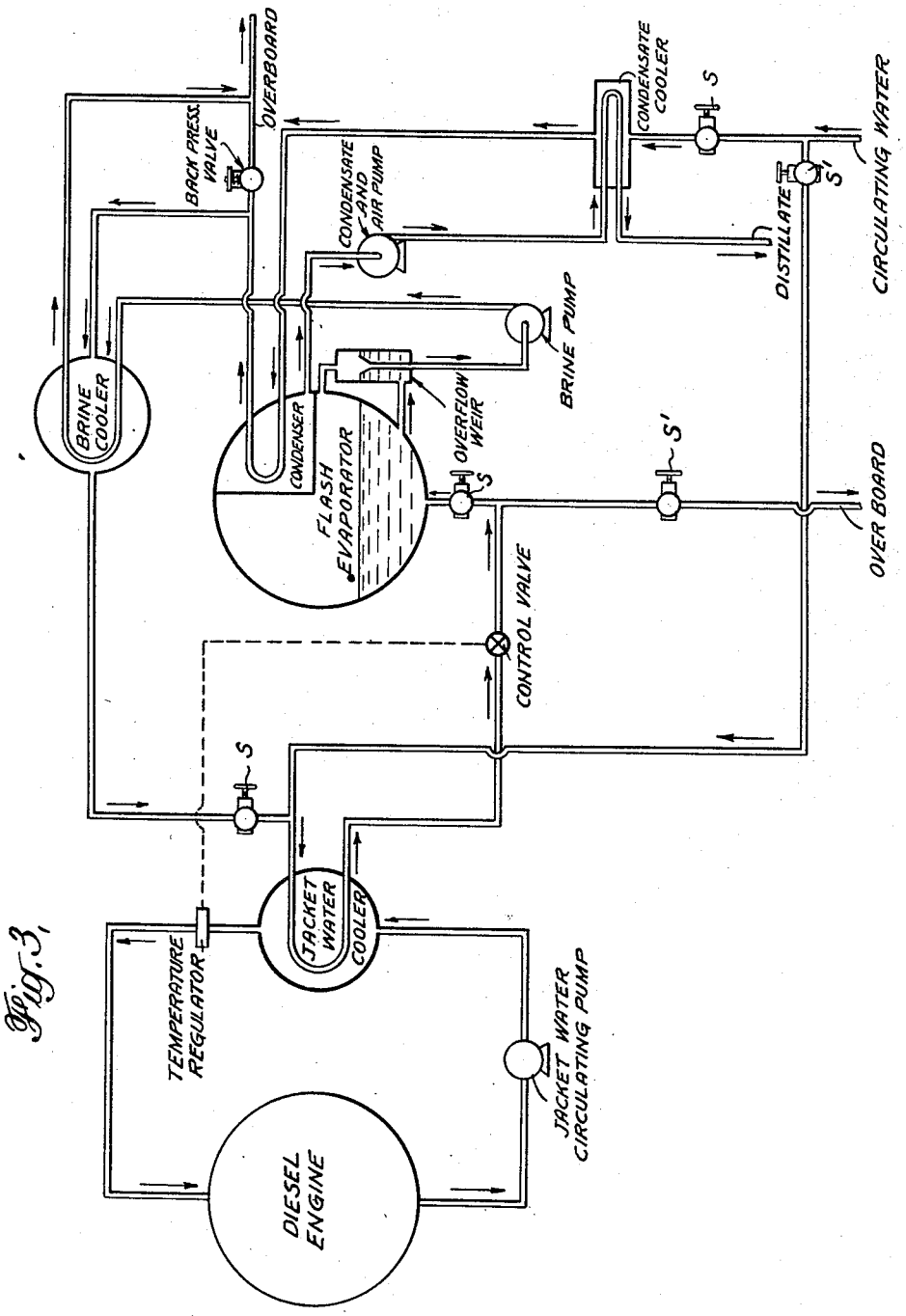

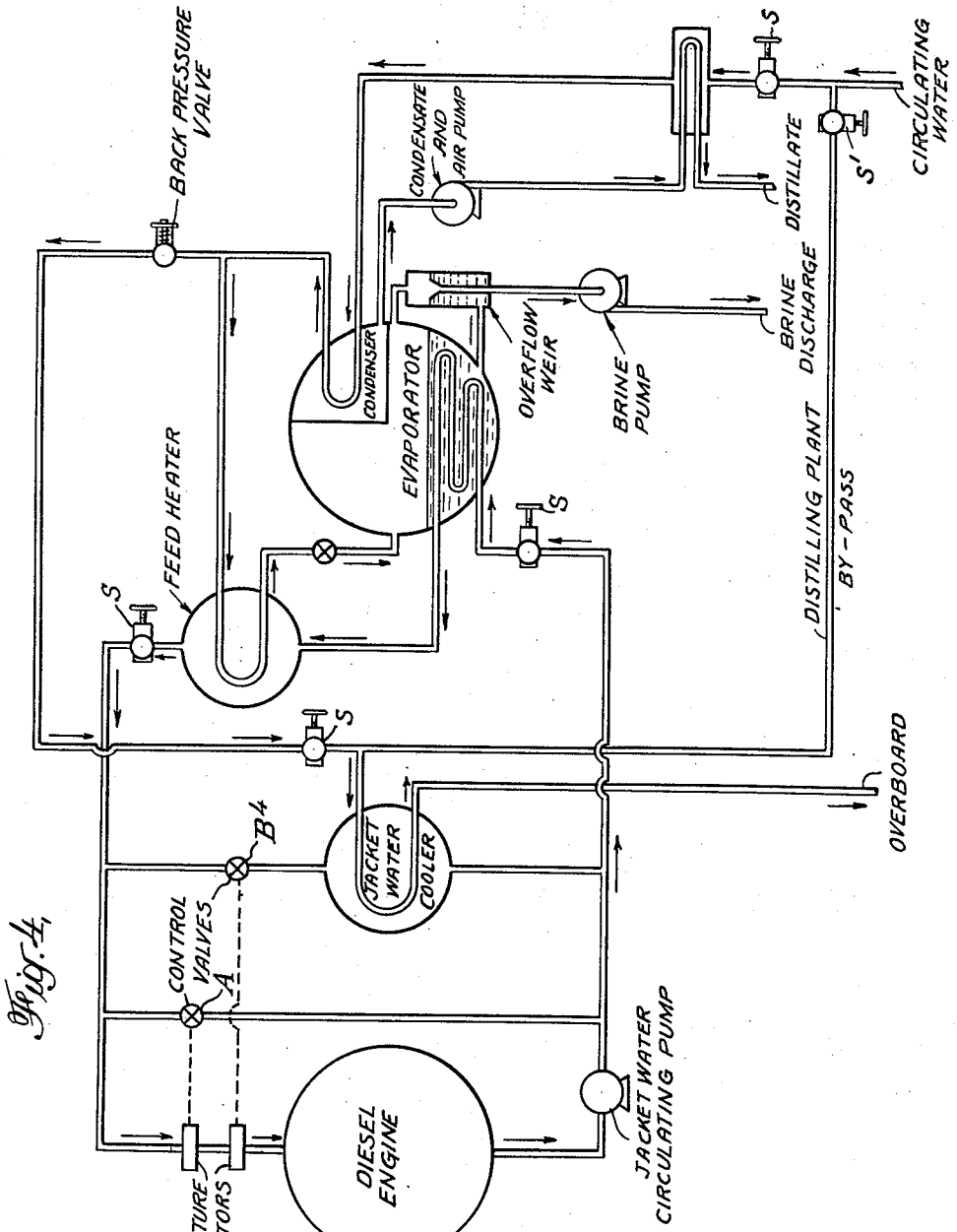

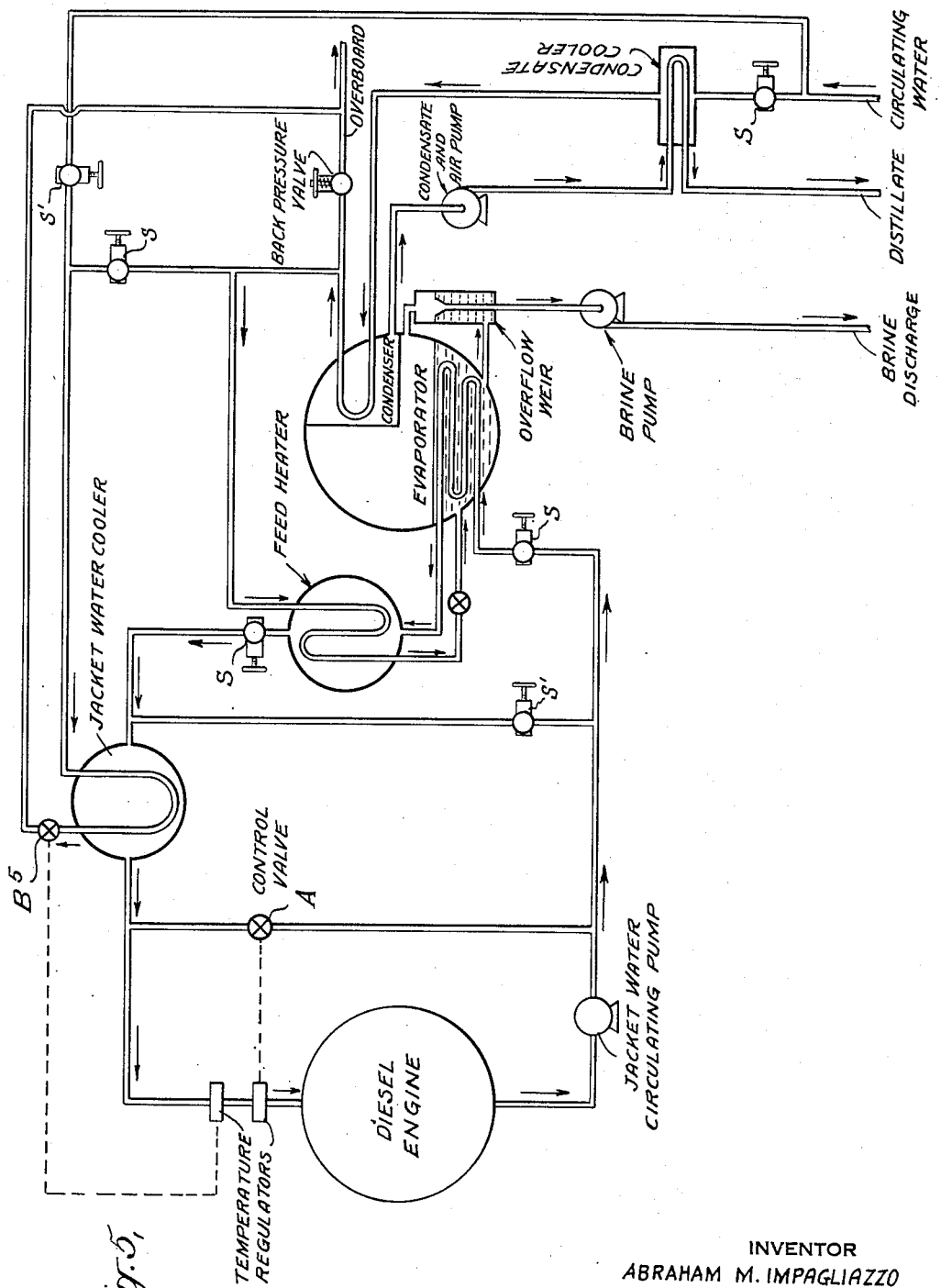

2,643,974

UNITED STATES PATENT OFFICE 2,643,974

APPARATUS FOR USING WASTE HEAT FROM HEAT ENGINES FOR EVAPORATION OF WATER

Abraham Michael Impagliazzo, Queens Village, N. Y., assignor to The Griscom-Russell Company, New York, N. Y., a corporation of Delaware Application January 31, 1946, Serial No. 644,541

3 Claims. (Cl. 202—163)

This invention relates to apparatus for using waste heat from heat engines for the evaporation of water.

The number of ships powered by diesel engines has been increasing for many years and on each of these ships, it has been necessary to provide some means of supplying them with fresh water. To this end various auxiliary boilers and distilling apparatus have been employed, but the use of such auxiliary apparatus is wasteful of fuel and affords an additional source of break-down and maintenance. Also distilling apparatus using exhaust gases have been constructed. Such apparatus is subject to substantial objection because of the extreme temperatures, corrosion and sooting involved.

To provide an economical and reliable source of fresh water on these diesel propelled ships, and in other heat engine installations needing it, I have discovered that the heat from the engine jacket water or engine lubricating oil can be used in conjunction with a vacuum distilling plant to produce distilled water from sea water.

As is well known, the heat energy of the fuel used for diesel engines is distributed approximately as follows:

|  | Per cent |
|---|---|
| Converted to useful work | 35 |
| Heat absorbed by lubricating oil | 8 |
| Heat absorbed by jacket water | 26 |
| Heat in the exhaust gases | 28 |
| Heat lost by radiation | 3 |

Applying the above percentages to a 3000 horsepower diesel installation, the following quantities of heat are produced in addition to the heat consumed in producing useful work:

|  | B. t. u. per hour |
|---|---|
| Heat in the jacket water | 5,670,000 |
| Heat in the lubricating oil | 1,740,000 |
| Heat in the exhaust | 6,100,000 |
| Radiation | 654,000 |

In such a plant, therefore, an efficient utilization of the engine jacket water alone would be sufficient to produce 15,000 gallons of distilled water a day. By using a distilling plant constructed according to my invention such efficient utilization is achieved.

My invention is further explained in detail by the accompanying drawings in which several different embodiments of my invention are schematically illustrated, in Figs. 1 through 5.

Fig. 1 illustrates the basic arrangement of a distilling plant constructed according to my invention. The approximate quantities and temperatures referred to are based upon the typical 3,000 horsepower engine installation previously discussed.

In conventional installations the jacket water of the engine flows in a closed circuit through the cooling jacket of the engine and a jacket water cooler, entering the engine jacket at a temperature of about 140° F. and leaving at a temperature of about 160° F. at an approximate rate of 284,000 pounds per hour. The drop between the exit and entrance temperatures as achieved by the jacket water cooler and the heat extracted is lost by discharge of the coolant.

When a distillation plant is added according to my invention, the quantities and temperatures of coolant described are not changed; neither is the jacket water cooler discarded. Instead, it is retained as a bypass so that the proper or desired exit or entrance temperatures can be maintained regardless of changes in the heat output of the diesel engine or the heat absorption of the distilling plant.

In the circuit according to my invention, the jacket water leaving the engine at 160° F. is fed through the heating coils of a vacuum evaporator. It leaves the evaporator and is passed into the shell of a feed water heater at about 140.6° F. Thereafter, it is reintroduced at the entrance temperature of 140° F. into the engine jacket.

Sea water is led into the system at a temperature, for example, of 85° F. at the rate of 240,000 pounds an hour, through a condensate cooler and then into the cooling coils of the condenser portion of the vacuum evaporator, from which a portion of it is led at 109° F. through the coils of the feed water heater and introduced as feed into the evaporator in which a part of it is vaporized. The vapor is condensed and removed from the condenser portion of the evaporator by a condensate and air pump and delivered to storage through the condensate cooler. A plant thus constructed yields approximately 5,350 pounds of distilled water an hour, at 95° F.

The unevaporated portion of the evaporator feed water is led off from the evaporator as brine, at the rate of 10,700 pounds an hour, at 120° F., and discarded. The portion of the sea water discharged from the cooling coils of the condenser and not fed into the feed water heater is simply discarded.

A preferred embodiment of a plant constructed according to my invention is shown in Fig. 2. In this construction the jacket water cooler is arranged in series with the evaporator and the control of exit and entrance temperatures of the jacket water is automatically effected by the temperature control valves A and $B^2$, by means of which the entrance temperature may be respectively raised or lowered.

Valve A is automatically regulated to bring water directly from the engine jacket exit to the entrance through a bypass, thus raising the entrance temperature of the cooling water when this temperature drops to a predetermined minimum. Valve $B^2$ is automatically regulated to permit a varying portion of the jacket water to flow through the jacket water cooler, thus lowering the entrance temperature of the cooling water when this temperature rises to a predetermined maximum.

The jacket water circuit through this plant leads the jacket water leaving the engine through the heating coils of the evaporator, through the shell of the feed water heater and thence through the jacket water cooler or through the bypass, depending upon the position of valve $B^2$.

Sea water is used to cool the condensate cooler, the condenser and the jacket water cooler. A portion of the sea water which flows through the condensate cooler and condenser is fed through the feed water heater as feed to the evaporator. The evaporator is operated at a fairly high vacuum to yield distillate and brine. That portion of the sea water needed to cool the condenser, but not required as feed for the evaporator, is not discharged directly overboard in this embodiment of my invention, but is fed into the jacket water cooler cooling circuit through a back pressure valve. Provision is made by means of valves marked S and S' to shut down the distilling plant without upsetting the automatically controlled cooling system. Valves marked S' are then opened and valves marked S are closed reversing their positions when the distilling plant is being operated.

A very simple embodiment of my invention is shown in Fig. 3. This embodiment is particularly suited for use in installations where the requirements for fresh water are not so great as to demand utilization of all the jacket water heat. In this embodiment of my invention, the jacket water flows through the jacket water cooler at all times. The coolant from this cooler is the feed water for a vacuum flash evaporator.

The sea water circuit in this embodiment of my invention is first through a condensate cooler and thence through the cooling coils of the condenser. Leaving the condenser a portion of this water is fed through the brine cooler to the jacket water cooler as coolant and evaporator feed. The flash evaporator receives the feed water and operating at high vacuum evaporates a portion of it. The brine is removed by an overflow weir and a portion of the heat in it recovered in a brine cooler before being discharged. The condensate is handled just as before described.

The bypass valves S and S' are provided to permit the jacket water cooler to be operated without operating the distilling plant when valves S' are opened and valves S are closed. The temperature control valve operated by the temperature regulator in the jacket water circuit serves by increasing or decreasing the rate of flow of coolant through the jacket water cooler to maintain the entrance temperature of the jacket water at a predetermined level. The back pressure valve fitted in the discharge from the condenser maintains a sufficient pressure at this point to enable a portion of the discharge from the condenser to flow through the brine cooler as evaporator feed while the remainder is discharged directly overboard. What proportion is used for evaporator feed and what proportion is discharged naturally is determined by the demands of the control valve for flow through the jacket water cooler.

Fig. 4 illustrates an arrangement in which the jacket water cooler is in parallel with the evaporator and fitted with temperature control valves A and $B^4$ for automatic regulation of jacket water temperature. Control valve $B^4$ operates to determine what proportion, if any, of the jacket water will pass through the jacket water cooler to keep its entrance temperature below the predetermined maximum.

Fig. 5 illustrates another arrangement of the preferred embodiment of my invention with the jacket water cooler in series with the evaporator. This arrangement is quite similar to that described in connection with Fig. 2, but different from it in that the jacket water always passes through the jacket water cooler, not being bypassed by the temperature control valve. Instead, entrance temperature is regulated to remain below the predetermined maximum by a temperature controlled valve $B^5$ which regulates the flow of coolant through the cooling system of the jacket water cooler.

It is to be understood that the specific quantities and temperatures given are by way of example only and that a vacuum distilling plant, according to my invention, may be operated using exit and entrance temperatures of the jacket water differing from those given depending on the particular diesel installation. Moreover, the invention can be used equally well with the lubricating oil of the diesel engine as a source of heat, instead of jacket water. Again automatic regulation of jacket water temperature can be accomplished by temperature control valves maintaining the exit temperature between limits instead of the entrance temperature. And clearly other forms of heat engines having passages in them through which an auxiliary fluid is circulated in a closed circuit and acquires excess heat which must be removed during the circulation may be used as well as a diesel engine. For example, fluid-cooled internal combustion engines of other types than diesel or any heat engine having a recirculating coolant or lubricant. Thus I do not desire to be limited to the specific structures described, but rather by the scope of the appended claims.

I claim:

1. Apparatus for the evaporation of liquid by the utilization of waste heat from heat engines carrying a principal load not derived from said apparatus including, in combination, a closed circuit for circulating an auxiliary fluid, said circuit including passages in the heat engine in which the fluid may absorb heat, a cooler in which the fluid may give up heat outside the apparatus, an evaporator heater in which the fluid may give up heat within the apparatus, piping connecting said cooler and said heater in parallel with each other to the exit and entrance to said engine passages, valve means in said piping intermediate said exit, said cooler and said heater, and further valve means intermediate said entrance, said cooler and said heater; a source of liquid to be evaporated and a vacuum evaporator charged from said source, said evaporator including an evaporating section containing said heater, a vapor condenser, a condensate collector and discharge, and a discharge for unevaporated charge liquid.

2. Apparatus according to claim 1 in which the circuit includes a bypass connecting the entrance and exit directly to each other, valve means in said bypass thermostatically controlled to permit more flow therethrough when the temperature of the fluid in the circuit reaches a predetermined minimum at a selected point, and further valve means in the piping connecting the cooler to the circuit thermostatically controlled to permit more flow therethrough when the temperature of the fluid in the circuit reaches a predetermined maximum at a selected point.

3. Apparatus for the evaporation of liquid by the utilization of waste heat from heat engines carrying a principal load not derived from said apparatus including, in combination, a closed circuit for circulating an auxiliary fluid, said circuit including passages in the heat engine in which the fluid may absorb heat, a cooler in which the fluid may give up heat outside the apparatus, an evaporator heater in which the fluid may give heat within the apparatus, piping interconnecting said cooler, said heater and the exit and entrance to said engine passages, and valve means in said piping for selectively directing the flow in said circuit through said cooler, said heater and said piping for regulating the temperature of the fluid therein; a source of liquid to be evaporated; and a vacuum evaporator charged from said source, said evaporator including an evaporating section containing said heater, a vapor condenser, a condensate collector and discharge, and a discharge for unevaporated charge liquid.

ABRAHAM MICHAEL IMPAGLIAZZO.

References Cited in the file of this patent

UNITED STATES PATENTS

| Number | Name | Date |
|---|---|---|
| 2,086,442 | Rushmore | July 6, 1937 |
| 2,280,093 | Kleinschmidt | Apr. 21, 1942 |
| 2,389,064 | Latham | Nov. 13, 1945 |

FOREIGN PATENTS

| Number | Country | Date |
|---|---|---|
| 270,471 | Germany | Feb. 17, 1914 |